(12) United States Patent
James et al.

(10) Patent No.: US 12,478,006 B2
(45) Date of Patent: Nov. 25, 2025

(54) CONTROLLED ENVIRONMENT AGRICULTURE SYSTEM INCLUDING MULTIPLE GROW SPACE CONDITION ZONES

(71) Applicant: MJNN LLC, South San Francisco, CA (US)

(72) Inventors: Andrew Keith James, San Francisco, CA (US); Michael Ryan Baldwin, Laramie, WY (US); Alan Colbrie Schoen, Los Gatos, CA (US); Nathaniel R. Storey, Laramie, WY (US); Gage Goodspeed Coffin, Los Altos Hills, CA (US); Michael Peter Flynn, Palo Alto, CA (US); Paul Bryan Kreiner, Menlo Park, CA (US)

(73) Assignee: MJNN LLC, South San Francisco, CA (US)

( * ) Notice: Subject to any disclaimer, the term of this patent is extended or adjusted under 35 U.S.C. 154(b) by 0 days.

(21) Appl. No.: 18/041,687

(22) PCT Filed: Aug. 20, 2021

(86) PCT No.: PCT/US2021/046972
§ 371 (c)(1),
(2) Date: Feb. 14, 2023

(87) PCT Pub. No.: WO2022/046564
PCT Pub. Date: Mar. 3, 2022

(65) Prior Publication Data
US 2024/0023501 A1     Jan. 25, 2024

Related U.S. Application Data

(60) Provisional application No. 63/139,943, filed on Jan. 21, 2021, provisional application No. 63/069,017, filed on Aug. 22, 2020.

(51) Int. Cl.
*A01G 31/04* (2006.01)
*A01G 31/06* (2006.01)

(52) U.S. Cl.
CPC ........... *A01G 31/045* (2013.01); *A01G 31/06* (2013.01)

(58) Field of Classification Search
CPC .... A01G 31/045; A01G 31/06; A01G 31/042; A01G 7/04; A01G 9/24; A01G 9/14;
(Continued)

(56) References Cited

U.S. PATENT DOCUMENTS 2,244,677 A    6/1941  Cornell
3,254,448 A    6/1966  Othmar
(Continued)

FOREIGN PATENT DOCUMENTS

EP    0610137 A1    8/1994
EP    3326452 A1    5/2018
(Continued)

OTHER PUBLICATIONS

International Application No. PCT/US2021/046972, Search Report mailed Jan. 13, 2022, 6 pgs.
(Continued)

*Primary Examiner* — Trinh T Nguyen
(74) *Attorney, Agent, or Firm* — Almanac IP Advisors LLP

(57) ABSTRACT

A controlled environment agriculture system including multiple environmental grow zones through which plants and/or lighting or other equipment that influence environmental equipment are cycled during the growth phase of farm production. In one implementation, the system includes multiple grow zones through which plants are cycled during the growth phase of farm production. The system may include a first environmentally-controlled growing chamber,
(Continued)

a second environmentally-controlled growing chamber, and one or more interfaces to allow a conveyance mechanism to transfer grow containers between the chambers. Each growth chamber may include environmental control systems, and associated sensors, for regulating at least one environmental condition, such as air temperature, airflow speed, relative air humidity, and ambient carbon dioxide gas content.

19 Claims, 5 Drawing Sheets

(58) Field of Classification Search
 CPC .......... A01G 9/18; A01G 31/02; A01G 31/04; A01G 7/045; A01G 9/246; A01G 9/247; A01G 9/249; A01G 9/26
 See application file for complete search history.

(56) References Cited

U.S. PATENT DOCUMENTS

| | | |
|---|---|---|
| 4,075,785 A | 2/1978 | Jones |
| 4,454,684 A | 6/1984 | O'Hare |
| 4,965,962 A | 10/1990 | Akagi |
| 5,502,923 A | 4/1996 | Bradshaw |
| 5,555,676 A | 9/1996 | Lund |
| 5,617,673 A | 4/1997 | Takashima |
| 5,862,628 A | 1/1999 | Takashima |
| 6,061,957 A | 5/2000 | Takashima |
| 7,049,743 B2 | 5/2006 | Uchiyama |
| 7,243,460 B2 | 7/2007 | Darlington |
| 7,415,796 B2 | 8/2008 | Brusatore |
| 7,533,493 B2 | 5/2009 | Brusatore |
| 7,536,827 B2 | 5/2009 | Busch et al. |
| 7,559,173 B2 | 7/2009 | Brusatore |
| 7,785,207 B2 | 8/2010 | Henry et al. |
| 7,921,601 B2 | 4/2011 | Henry et al. |
| 8,074,398 B2 | 12/2011 | Hazan |
| 8,122,642 B1 | 2/2012 | Huberman et al. |
| 8,141,294 B2 | 3/2012 | Bribach et al. |
| 8,151,518 B2 | 4/2012 | Adams et al. |
| 8,234,813 B2 | 8/2012 | Busch et al. |
| 8,250,808 B2 | 8/2012 | Kania et al. |
| 8,250,809 B2 | 8/2012 | Simmons |
| 8,327,579 B2 | 12/2012 | Kania et al. |
| 8,327,582 B2 | 12/2012 | Storey |
| 8,627,598 B1 | 1/2014 | Souder et al. |
| 8,689,485 B2 | 4/2014 | Friedman |
| 8,756,862 B1 | 6/2014 | Huberman et al. |
| 9,043,962 B2 | 6/2015 | Trofe |
| 9,282,699 B2 | 3/2016 | Anderson et al. |
| 9,357,715 B2 | 6/2016 | Cottrell |
| 9,359,759 B2 | 6/2016 | Otamendi |
| 9,374,952 B1 | 6/2016 | Cross |
| 9,380,751 B2 | 7/2016 | Storey |
| 9,445,557 B2 | 9/2016 | Darlington |
| 9,468,154 B2 | 10/2016 | Carpenter |
| 9,474,217 B2 | 10/2016 | Anderson et al. |
| 9,491,915 B2 | 11/2016 | Storey |
| 9,510,524 B2 | 12/2016 | Anderson et al. |
| 9,591,814 B2 | 3/2017 | Collins et al. |
| 9,730,400 B2 | 8/2017 | Wilson et al. |
| 9,814,186 B2 | 11/2017 | Anderson et al. |
| 9,854,750 B2 | 1/2018 | Brusatore |
| 9,924,639 B1 | 3/2018 | Arrighi |
| 9,974,243 B2 | 5/2018 | Martin |
| 10,022,873 B2 | 7/2018 | Larrea-Tamayo et al. |
| 2004/0103583 A1 | 6/2004 | Eriksen et al. |
| 2005/0268547 A1 | 12/2005 | Uchiyama |
| 2006/0162252 A1 | 7/2006 | Lim |
| 2006/0201058 A1 | 9/2006 | Ripatti |
| 2007/0033866 A1 | 2/2007 | Henry et al. |
| 2007/0033867 A1 | 2/2007 | Henry et al. |
| 2007/0051036 A1 | 3/2007 | Henry et al. |
| 2007/0051037 A1 | 3/2007 | Henry et al. |
| 2007/0051038 A1 | 3/2007 | Henry et al. |
| 2008/0086942 A1 | 4/2008 | Maier |
| 2009/0139927 A1 | 6/2009 | Kania et al. |
| 2009/0223126 A1 | 9/2009 | Garner et al. |
| 2011/0005132 A1 | 1/2011 | Kania et al. |
| 2011/0005133 A1 | 1/2011 | Kania et al. |
| 2011/0005134 A1 | 1/2011 | Kania et al. |
| 2011/0005444 A1 | 1/2011 | Kania et al. |
| 2011/0005446 A1 | 1/2011 | Kania et al. |
| 2011/0005447 A1 | 1/2011 | Kania et al. |
| 2011/0005449 A1 | 1/2011 | Kania et al. |
| 2011/0131876 A1 | 6/2011 | Pettibone |
| 2011/0146559 A1 | 6/2011 | Kania et al. |
| 2012/0167460 A1 | 7/2012 | Omidi |
| 2012/0279122 A1 | 11/2012 | Benne et al. |
| 2012/0285084 A1 | 11/2012 | Hu |
| 2013/0019527 A1 | 1/2013 | Howe-Sylvain |
| 2013/0067814 A1 | 3/2013 | Riley et al. |
| 2013/0298462 A1 | 11/2013 | Moran |
| 2014/0000162 A1 | 1/2014 | Blank |
| 2014/0115958 A1 | 5/2014 | Helene et al. |
| 2014/0137472 A1 | 5/2014 | Anderson et al. |
| 2014/0223816 A1 | 8/2014 | Parker |
| 2014/0259904 A1 | 9/2014 | Collard |
| 2014/0318010 A1 | 10/2014 | Tomlinson |
| 2015/0000191 A1 | 1/2015 | Nagadome |
| 2015/0027051 A1 | 1/2015 | Anderson et al. |
| 2015/0230419 A1 | 8/2015 | Ishizaka et al. |
| 2015/0351329 A1 | 12/2015 | Heidi et al. |
| 2016/0000018 A1 | 1/2016 | Elmpt et al. |
| 2016/0073589 A1 | 3/2016 | McNamara et al. |
| 2016/0135393 A1 | 5/2016 | Ruanova |
| 2016/0135398 A1 | 5/2016 | Mathieu et al. |
| 2016/0192594 A1 | 7/2016 | Mawendra |
| 2016/0212946 A1 | 7/2016 | Higgins |
| 2016/0227722 A1 | 8/2016 | Storey |
| 2016/0235025 A1 | 8/2016 | Bray |
| 2016/0270304 A1 | 9/2016 | Higgins |
| 2016/0353672 A1 | 12/2016 | Hoffman |
| 2017/0000038 A1 | 1/2017 | Collard |
| 2017/0013810 A1 | 1/2017 | Grabell et al. |
| 2017/0020082 A1 | 1/2017 | Storey |
| 2017/0027119 A1 | 2/2017 | Storey |
| 2017/0055460 A1 | 3/2017 | Brusatore |
| 2017/0055461 A1 | 3/2017 | Neuhoff, Jr. et al. |
| 2017/0055474 A1 | 3/2017 | Storey |
| 2017/0064912 A1 | 3/2017 | Tabakman |
| 2017/0086399 A1 | 3/2017 | Anderson et al. |
| 2017/0181393 A1 | 6/2017 | Nelson |
| 2017/0202162 A1 | 7/2017 | Dufresne et al. |
| 2017/0231167 A1 | 8/2017 | Storey |
| 2017/0231168 A1 | 8/2017 | Storey |
| 2017/0303484 A1 | 10/2017 | Wilson et al. |
| 2017/0303485 A1 | 10/2017 | Wilson et al. |
| 2017/0339841 A1 | 11/2017 | Monasterio |
| 2017/0347537 A1 | 12/2017 | Beaulieu |
| 2018/0007850 A1 | 1/2018 | Dufresne et al. |
| 2018/0014471 A1 | 1/2018 | Jensen et al. |
| 2018/0014485 A1 | 1/2018 | Whitcher et al. |
| 2018/0014486 A1 | 1/2018 | Creechley et al. |
| 2018/0042186 A1 | 2/2018 | Kop |
| 2018/0077884 A1 | 3/2018 | Barker et al. |
| 2018/0084713 A1 | 3/2018 | Ito et al. |
| 2018/0084739 A1 | 3/2018 | Bottari |
| 2018/0098513 A1 | 4/2018 | Ritchie |
| 2018/0098515 A1 | 4/2018 | Anderson et al. |
| 2018/0146618 A1 | 5/2018 | Elazary et al. |
| 2018/0153113 A1 | 6/2018 | Storey et al. |
| 2018/0153115 A1 | 6/2018 | Edke et al. |
| 2018/0168108 A1 | 6/2018 | Foreman et al. |
| 2018/0206414 A1 | 7/2018 | Goodman et al. |

(56) References Cited

U.S. PATENT DOCUMENTS

2019/0230867 A1    8/2019  Hoffman
2019/0335676 A1*   11/2019 Solomon .............. A01G 31/042

FOREIGN PATENT DOCUMENTS

| JP | H0614663 A | 1/1994 |
| RU | 2720919 C1 * | 5/2020 |
| WO | 2016166311 A1 | 10/2016 |
| WO | 2017217130 A1 | 12/2017 |

OTHER PUBLICATIONS

International Application No. PCT/US2021/046972, Written Opinion mailed Jan. 13, 2022, 13 pgs.

* cited by examiner

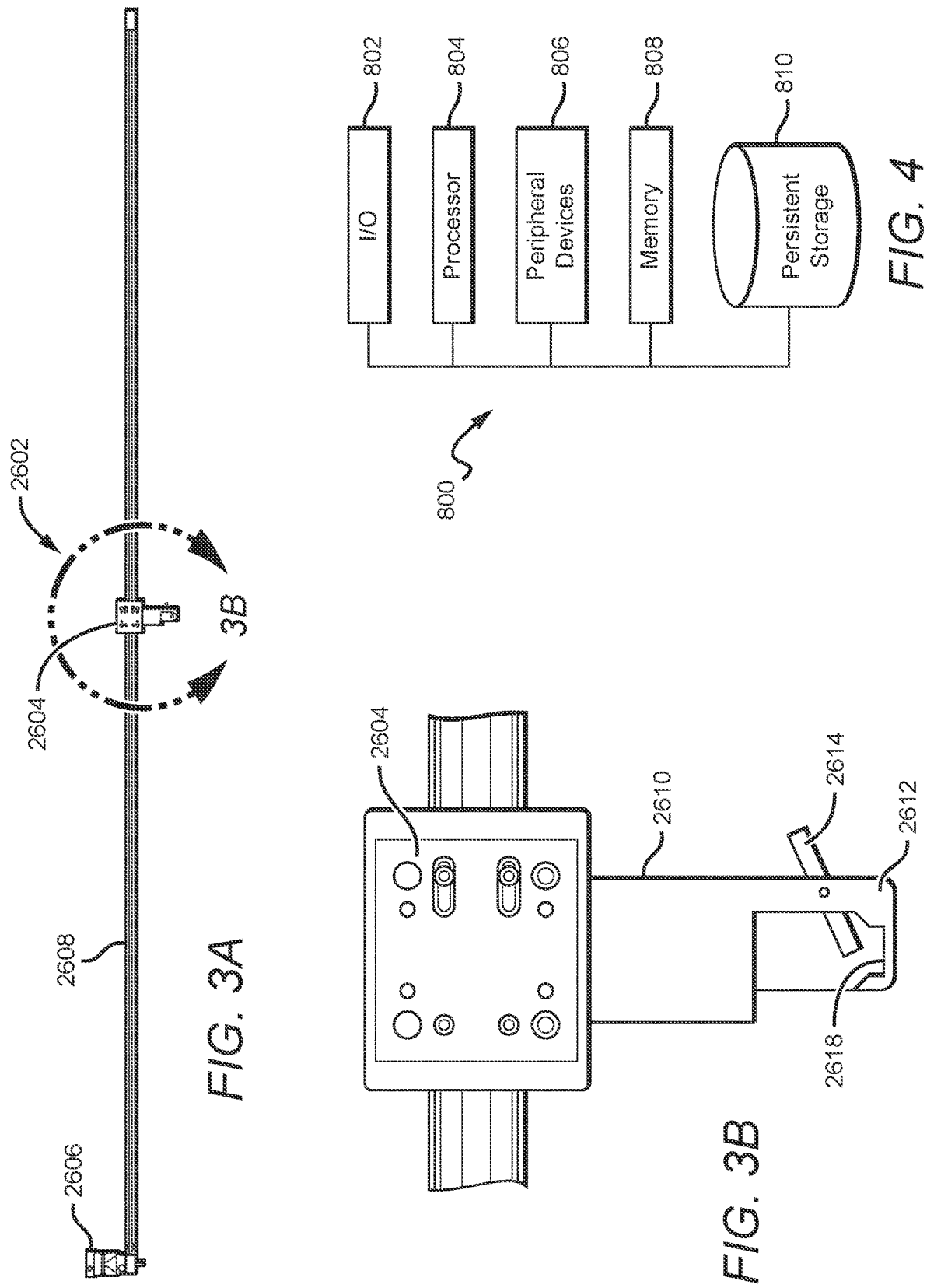

CONTROLLED ENVIRONMENT AGRICULTURE SYSTEM INCLUDING MULTIPLE GROW SPACE CONDITION ZONES

CROSS-REFERENCE TO RELATED APPLICATIONS

The present application is the National Stage of International Application No. PCT/US21/046972, filed Aug. 20, 2021, which claims priority to U.S. Provisional Application Ser. No. 63/069,017 filed Aug. 22, 2020 and 63/139,943 filed Jan. 21, 2021, all of which are incorporated herein by reference for all purposes.

FIELD OF THE DISCLOSURE

The disclosure relates generally to the field of controlled-environment agriculture and, in particular, to an automated farm production system including a plurality of grow space zones having different environmental conditions or target conditions.

BACKGROUND

During the twentieth century, agriculture slowly began to evolve from a conservative industry to a fast-moving high-tech industry in order to keep up with world food shortages, climate change and societal changes. Farming began to move away from manually-implemented agriculture techniques toward computer-implemented technologies. In the past, and in many cases still today, farmers only had one growing season to produce the crops that would determine their revenue and food production for the entire year. However, this is changing. With indoor growing as an option and with better access to data processing technologies, among other advanced techniques, the science of agriculture has become more agile. It is adapting and learning as new data is collected and insights are generated.

Advancements in technology are making it feasible to control the effects of nature with the advent of "controlled indoor agriculture" or "controlled-environment agriculture." Improved efficiencies in space utilization, lighting, and a better understanding of hydroponics, aeroponics, crop cycles, and advancements in environmental control systems have allowed humans to better recreate environments conducive for agriculture crop growth with the goals of greater yields per square foot, better nutrition and lower cost.

US Patent Publication Nos. 2018/0014485 and 2018/0014486, both assigned to the assignee of the present disclosure and incorporated by reference in their entirety herein, describe environmentally controlled vertical farming systems. The vertical farming structure (e.g., a vertical column) may be moved about an automated conveyance system in an open or closed-loop fashion, exposed to precision-controlled lighting, airflow and humidity, with ideal nutritional support.

US Patent Pub. No. US 2017/0055460 ("Brusatore") describes a system for continuous automated growing of plants. A vertical array of plant supporting arms extends radially from a central axis. Each arm includes pot receptacles which receive the plant seedling, and liquid nutrients and water. The potting arms are rotated beneath grow lamps and pollinating arms. However, the spacing between plants appears to be fixed.

U.S. Pat. No. 2,244,677 to Cornell describes a plant production system that conveys a vertical box-shaped frame within a greenhouse structure. A chain-drive mechanism conveys the vertical box-like frames in a track where they are exposed to controlled environmental conditions. Cornell, however, does not contemplate a plant production system that includes multiple grow zones with different environmental conditions and a conveyance system that conveys plants through the zones during a growing cycle.

SUMMARY OF THE DISCLOSURE

Embodiments of the disclosure are directed to a controlled environment agriculture system including multiple environmental grow zones.

In one implementation, the system includes multiple grow zones through which plants are cycled during the growth phase of farm production. The system may include a first environmentally-controlled growing chamber, a second environmentally-controlled growing chamber, and one or more interfaces to allow a conveyance mechanism to transfer grow containers between the chambers. Each growth chamber may include environmental control systems, and associated sensors, for regulating at least one environmental condition, such as air temperature, airflow speed, relative air humidity, and ambient carbon dioxide gas content. For example, a first chamber can be configured to operate as a so-called "day" zone where plants contained in grow containers are subjected to a first set of environmental conditions. A second chamber can be configured to operate as a so-called "night" zone with little or no lighting and a lower temperature set point relative to the day zone. A control system can cause a conveyance mechanism to cycle the grow containers between these chambers on a desired time schedule.

In other implementations, the system includes multiple grow zones where the plants or crops remain, but where one or more elements that control growing conditions (e.g., lighting or HVAC systems) are selectively provided or routed according to a growing cycle during the growth phase of farm production.

Implementations of the invention can be configured to achieve a number of advantages from an operational and cost standpoint. For example, using a dedicated night zone or night zone equipment may allow for using fewer light sources to serve the same number of plant sites. Separating grow environments also allows for HVAC systems to run at more constant settings, which reduces the operating costs of transition between set points. It further allows the HVAC systems to be optimized to a tighter operating range which reduces the capital expenditure costs associated with these systems. Implementations the invention may also be configured to have especial application and advantages for plants or other crops that require specific diurnal photoperiods and temperature requirements, such as strawberries or other fruiting crops.

BRIEF DESCRIPTION OF THE DRAWINGS

FIG. 3A is an elevation view of an example return transfer mechanism; and FIG. 3B is an enlarged view of an example carriage for the return transfer mechanism.

FIG. 4 illustrates an example of a computer system that may be used to execute instructions stored in a non-transitory computer readable medium (e.g., memory) in accordance with embodiments of the disclosure.

DETAILED DESCRIPTION

The present description is made with reference to the accompanying drawings, in which various example embodiments are shown. However, many different example embodiments may be used, and thus the description should not be construed as limited to the example embodiments set forth herein. Rather, these example embodiments are provided so that this disclosure will be thorough and complete. Various modifications to the exemplary embodiments will be readily apparent to those skilled in the art, and the generic principles defined herein may be applied to other embodiments and applications without departing from the spirit and scope of the disclosure. Thus, this disclosure is not intended to be limited to the disclosed embodiments, but is to be accorded the widest scope consistent with the claims and the principles and features disclosed herein.

The present disclosure describes a controlled-environment agriculture system having multiple environmental grow zones through which plants are cycled during the growth phase of farm production. Embodiments of the disclosure can be implemented in a vertical farm production system that includes grow towers as described herein. Lastly, the present invention is not limited to any particular crop production environment. Implementations of the invention may be used in an automated controlled grow environment with vertical grow structures, an environment with horizontal structures, or any other suitable crop production environment.

Figure 1:
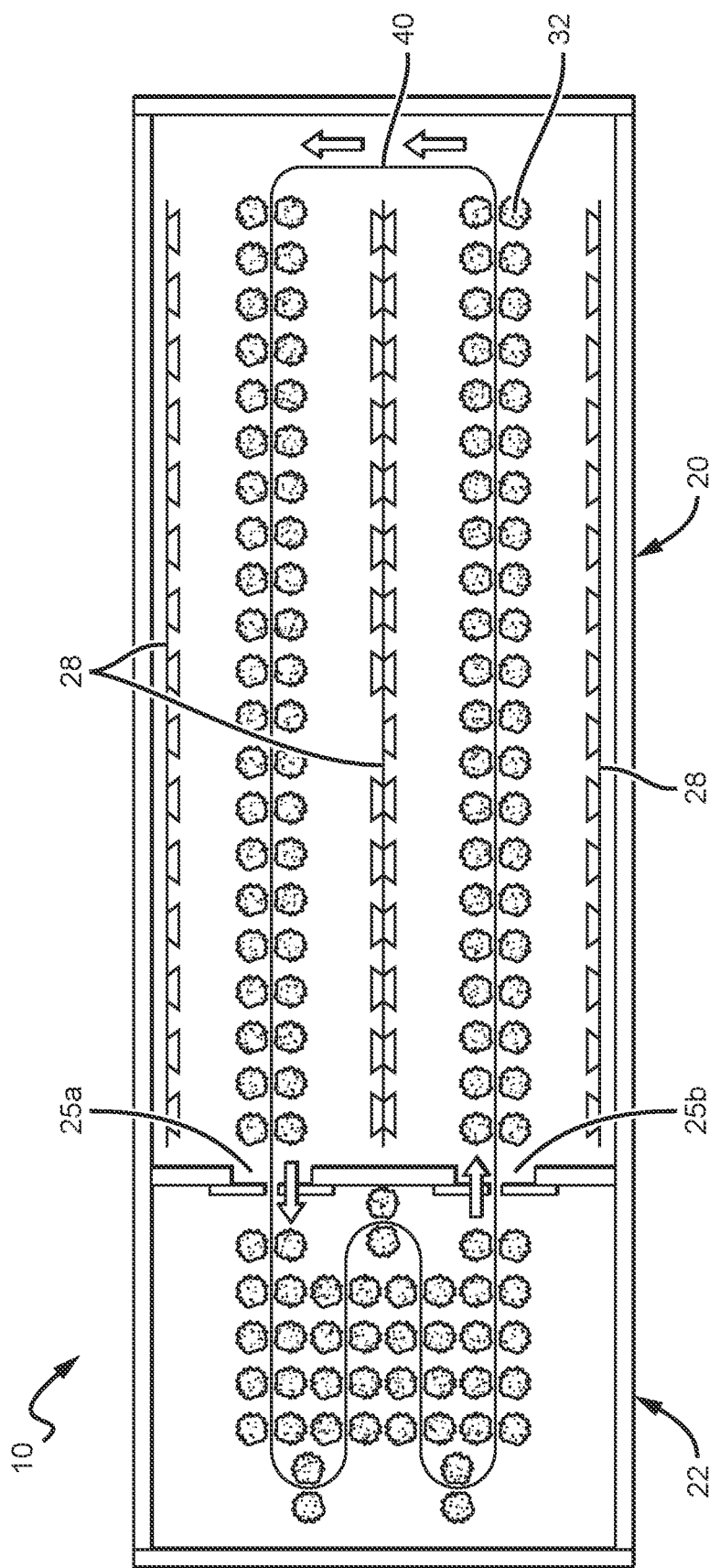
FIG. 1 is a functional block diagram illustrating an example controlled environment agriculture system including two growing zones.

FIG. 1 is a functional block diagram illustrating an example controlled environment agriculture system 10 including multiple grow space zones. At a high level, the system 10 may include a first environmentally-controlled growing chamber 20, a second environmentally-controlled growing chamber 22, and one or more interfaces 25a, 25b to allow a conveyance mechanism to transfer grow containers between the chambers 20, 22. The crops or plant species that may be grown may be gravitropic/geotropic and/or phototropic, or some combination thereof. The crops or plant species may vary considerably and include various leaf vegetables, fruiting vegetables, flowering crops, fruits and the like. The controlled environment agriculture system 10 may be configured to grow a single crop type at a time or to grow multiple crop types concurrently.

As FIG. 1 illustrates a conveyance mechanism may convey grow containers 32 containing a crop or plant to be grown during a growth cycle along a grow path 40 between chambers 20, 22. Not shown are systems for extracting grow containers 32 from chambers 20 or 22 or for injecting grow containers 32 into chambers 20 or 22. For didactic purposes, one implementation of the system is described in connection with a farm system that employs vertical grow towers. In one implementation, the grow containers may be vertical grow towers including grow sites along one or more faces of each tower, as disclosed in International Application Serial No. PCT/US19/058764, which is incorporated by reference herein for all purposes. Grow containers 32 may be stackable pods, towers, trays or any other suitable structure for housing plant growth media and root structures. The grow containers 32 may be arranged or attached to each other in sets, arrays or matrices.

Each growth chamber 20, 22 may include environmental control systems, and associated sensors, for regulating at least one environmental condition, such as air temperature, airflow speed, relative air humidity, and ambient carbon dioxide gas content. The control systems may, for example, include such sub-systems as HVAC units, chillers, fans and associated ducting and air handling equipment. The controlled environment agriculture system 10 may include corresponding sensors and programming logic for tracking the grow containers 32 during various stages of the farm production cycle and/or for controlling one or more conditions of the growth chambers. The operation of control system and the length of time containers remain in chambers 22 can vary considerably depending on a variety of factors, such as crop type and other factors. The control system is capable of automated adjustments to optimize growing conditions within the growth chambers 20, 22 to make continuous improvements to various attributes, such as crop yields, visual appeal and nutrient content. In addition, US Patent Publication Nos. 2018/0014485 and 2018/0014486 describe application of machine learning and other operations to optimize grow conditions in a farming system. In some implementations, environmental condition sensors may be disposed proximal to the containers or at various locations in growth chambers 20, 22. When crops are ready for harvesting, grow containers 32 to be harvested may be transferred from either chamber 20 or 22 for harvesting and other processing operations. In other implementations, the grow containers may be harvested in place and not transferred out of a chamber.

One or both of growth chambers 20, 22 may include light emitting sources positioned at various locations between and/or along the grow path 40. The light emitting sources can be positioned laterally relative to the grow containers (such as a grow tower). For example, the light emitting sources may be configured to emit light toward the lateral faces of grow towers that include openings from which crops grow. The light emitting sources may be incorporated into a water-cooled, LED lighting system as described in U.S. Publ. No. 2017/0146226A1, the disclosure of which is incorporated by reference herein. In such an embodiment, the LED lights may be arranged in a bar-like structure. The bar-like structure may be placed in a vertical orientation to emit light laterally to substantially the entire length of adjacent grow towers. Multiple light bar structures may be arranged in a chamber 20, 22 along grow path. Other lighting systems and configurations may be employed. For example, the light emitting elements may be arranged in a grid-like structure running along the grow path. In the implementation illustrated in FIG. 1, chamber 20 includes light emitting elements 28, while chamber 22 contains no light emitting elements.

The system 10 may also include an irrigation system configured to supply an aqueous nutrient solution to the crops as they translate through chambers 20, 22. In implementations using grow towers, the nutrient supply system may apply aqueous nutrient solution to the top of the grow towers. Gravity may cause the solution to travel down the vertically-oriented grow towers and through the length thereof to supply solution to the crops disposed along the length of the grow tower. The growth environment 20 may also include an airflow source configured to, when a tower is mounted to a grow line 202, direct airflow in the lateral growth direction of growth and through an under-canopy of the growing plant, so as to disturb the boundary layer of the under-canopy of the growing plant. In other implementations, airflow may come from the top of the canopy or orthogonal to the direction of plant growth. In one implementation, the irrigation system may be configured to operate differently or independently relative to each chamber 20 and 22. For example, the irrigation system may be configured to operate to supply nutrient solution according to a different schedule and/or at different parameters (e.g., dosing, temperature, etc.) in chamber 20 relative to chamber 22. For example, irrigation system could apply a continuous supply of solution for plants in chamber 20, and a pulse irrigation regime for plants contained in chamber 22.

For didactic purposes, the following describes example operating conditions and processes for utilizing the system illustrated in FIG. 1. The system illustrated in FIG. 1 can be configured to support the growth of crops, such as strawberries, that have particular diurnal photoperiod and thermal requirements. Chamber 20 can be configured to operate as a so-called "day" zone where plants contained in grow containers 32 are subjected to a first set of environmental conditions. For purposes of illustration, these environmental conditions may include a temperature set point (e.g., 23 degrees Celsius), as well as desired lighting and humidity parameters. Chamber 22 can be configured to operate as a so-called "night" zone with little or no lighting and a lower temperature set point (e.g., 12 degrees C.).

The arrows in FIG. 1 indicate the overall direction of travel of grow containers 32 within the system 10. The conveyance mechanism can be configured and controlled such that a given grow container 32 remains in chamber 20 for a desired amount of time (e.g., 16 hours) exposed to a set of "day" environmental conditions, and is transferred under programmatic control to chamber 22 to be exposed to "night" environmental conditions for a desired period of time (e.g., 8 hours). As FIG. 1 illustrates, the conveyance mechanism can be configured to function as a loop to cycle grow containers 32 between "day" chamber 20 and "night" chamber 22 according to a desired schedule (such as 16 hours "day" time and 8 hours "night" time conditions). As shown in FIG. 1, the containers 32 when in the "night" chamber 22 may be more closely spaced given that light emitting elements are not required.

Interfaces 25a, 25b may each be formed by a slot or other gap in the physical barrier or wall that separates chambers 20 and 22. The interfaces 25a, 25b may also include doors that open and close to permit grow containers 32 to pass through. Other implementations are also possible. For example, an air curtain system can be used to generate a barrier of air to substantially separate the environments of chambers 20, 22. Other components and functions can be disposed at or near interfaces 25a, 25b. For example, interfaces 25a and/or 25b can be equipped with a physical brushing mechanism to disturb the plants as they pass to augment pollination efficiency. Insect traps may also be disposed along interfaces 25a, 25b. In addition, certain sensors could be disposed at or near interfaces 25a, 25b, such as high definition cameras, chlorophyll fluorescence detectors, etc. to sense or detect one or more conditions of the crop within grow containers 32.

As discussed above, the present specification also describes how system 10 could be used in a vertical grow tower system. Growing chamber 20 may contain one to a plurality of vertical grow lines 202 that include conveyance systems to translate grow towers 50 along the grow lines 202 within the growing chamber 20. The system 10 may also include conveyance systems for moving the grow towers 50 in a circuit throughout the crop's transplanting, growth and processing cycle, the circuit comprising a staging area configured for loading the grow towers 50 into and out a grow line 202. As discussed in International Application Serial No. PCT/US19/058764 (the entire disclosure of which is incorporated by reference herein for all purposes), a central processing system may include one or more conveyance mechanisms for directing grow towers 50 to stations in the central processing system—e.g., stations for loading plants into, and harvesting crops from, the grow towers 50.

Other conveyance mechanisms can be used to transfer grow towers 50 from a central processing system into either of the growth chambers 20, 22, and vice versa. For example, a power-and-free conveyor system could be used to carry grow towers into and out of growth environments 20, 22 via interfaces 262. As with interfaces 25a, 25b, these interfaces 262 may include doors or other mechanisms to seal the space.

Each grow tower 50 is configured for containing plant growth media that supports a root structure of at least one crop plant growing therein. Each grow tower 50 is also configured to releasably attach to a grow line 202 in a vertical orientation and move along the grow line 202 within growth environment 20 during a growth phase. Together, the grow lines 202 contained within the growth chamber 20, the grow lines in chamber 22 and the stations of the central processing system (including associated conveyance mechanisms) can be arranged in a production circuit under control of one or more computing systems. International Application Serial No. PCT/US19/058764 and U.S. application Ser. No. 16/893,833 (incorporated by reference herein) describe how plants contained in grow towers 50 may be irrigated.

Figure 2:
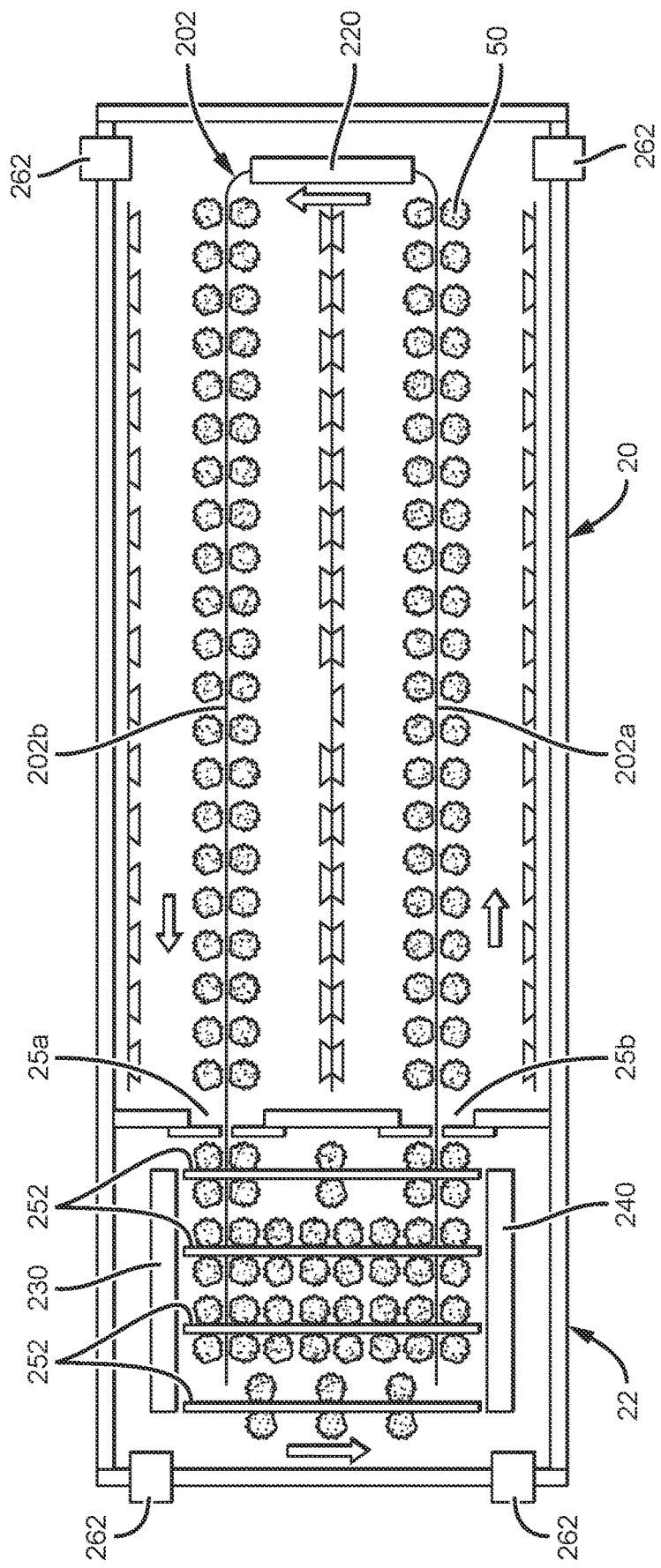
FIG. 2 is a functional block diagram illustrating application of the principles of the invention to a vertical grow tower farming system according to an example embodiment.

As FIG. 2 illustrates, the grow line 202 may have a substantially u-shaped travel path including a first path section 202a and a second return path section 202b. As discussed below, a return transfer mechanism 220 transfers grow towers 50 from the end of the first path section 202a to the second return path section 202b. Each path section 202a, 202b of a grow line 202 supports a plurality of grow towers 50. In one implementation, a grow line 202 may be mounted to the ceiling (or other support) of the grow structure by a bracket for support purposes. In one implementation, each of grow line 202a, 202b may extend at least partially into growth environment 22, where mechanisms 230, 240 may selectively load grow towers 50 onto and off grow lines 252.

As discussed in International Application Serial No. PCT/US19/058764, a hook attaches a grow tower 50 to a grow line 202, thereby supporting the tower 50 in a vertical orientation as it is translated through the growth chamber 20. In one implementation, the vertical tower conveyance system utilizes a reciprocating linear ratchet and pawl structure (hereinafter referred to as a "reciprocating cam structure or mechanism") to move grow towers 50 along a path section 202a, 202b of a grow line 202. A return transfer mechanism 220 transfers grow towers from a first path section 202a to the second return path section 202b, causing grow towers 50 to travel in a substantially u-shaped path within chamber 20.

In the implementation shown in FIG. 2, each grow line 202 includes a separate return transfer mechanism 220. In other implementations, a single return transfer mechanism 220 can be configured to span across and serve multiple grow lines 202. As FIG. 3A illustrates, in one implementation, the return transfer mechanism 220 comprises a belt-driven actuator 2602 that drives a carriage 2604 along a track 2608 using a servo motor 2606. The MSA series of actuators offered by Macron Dynamics, Inc. of Croydon, PA are examples of belt-driven actuators suitable for use in various implementations disclosed herein. Carriage 2604 includes a lower section 2610 that includes a hook receiver section 2612 including a groove 2618 that engages a hook attached to a grow tower 50. Receiver section 2612 may also have a latch 2614 which closes down on the outer side of the grow tower 50 to prevent a grow tower 50 from sliding off during acceleration or deceleration associated with return transfer conveyance. In one implementation, a controller may control return transfer mechanism 220 to move carriage 2604 such that groove 2618 aligns with the track of a first path section 202a of a select grow line 202. A linear actuator attached proximally to the offload end of the first path section 202a can push a grow tower 50 onto receiver section 2612. Alternatively, the reciprocating cam mechanism associated with first path section 202a can be configured to push the grow tower 50 onto receiver section 2612. When hook 52 of grow tower 50 is engaged in receiver section 2612, a controller may cause servo motor 2606 to move carriage 2604 to the onload end of return path section 202b of the grow line 202 such that the hook 52 is aligned with the track. A second linear actuator attached proximally to the onload end of the return path section 202b may slide the grow tower from receive section 2612 onto the track. Alternatively, the reciprocating cam mechanism associated with return path section 202b can be configured to transfer the grow tower 50 from receiver section 2612. As discussed above, the length of the track 2608 is configured to span either a first path section 202a and a return path section 202b, or to span across multiple grow lines 202 to allow a single return transfer mechanism 220 to operate in connection with these grow lines 202 (schematically, this can be envisioned by extending the individual elements 220 into a return transfer mechanism with a single contiguous track).

In other implementations, other types of return transfer mechanisms 220 may be configured for each grow line 202. For example, pneumatic actuators can be employed to move a carriage similar to carriage 2604 above along a track back and forth as required to perform the transfer operations described herein. Other return transfer mechanisms can also be employed. For example, the return transfer mechanism may comprise a swinging arm that engages a grow tower 50 at the offload end of first path section 202a and swings 180 degrees to translate the grow tower 50 to the onload end of the return path section 202b. In another implementation, return transfer mechanism 220 may include a semi-circular track section spanning the first and second path sections 202a, 202b of grow line 202. In such an implementation, a wheel including paddles can push grow towers around the semi-circular track section with each movement cycle of the grow line 202.

Similar conveyance mechanisms may be used to transfer grow towers 50 into, within and out of chamber 22. For example, chamber 22 may include multiple grow lines 252 for holding grow towers 50. As discussed above, these grow lines 252 may be closely spaced without concern from lighting access, etc. The grow lines 252 may include a ratcheting pawl mechanism similar to grow line sections 202a, 202b. Still further, an onload conveyance mechanism 230 may transfer grow towers 50 received at interface 25a onto a select grow line 252. An offload conveyance mechanism 240 may load a grow tower 50 from a grow line 252 onto grow line section 202 at interface 25b. Other conveyance mechanisms can be used along grow lines 252, such as those discussed above, including a power-and-free conveyor system. Other implementations for moving vertical grow towers 50 may be employed. For example, a lead screw mechanism may be employed. In such an implementation, the threads of the lead screw engage hooks disposed on grow line 202 and move grow towers 50 as the shaft rotates. The pitch of the thread may be varied to achieve one-dimensional plant indexing. In another implementation, a belt conveyor include paddles along the belt may be employed to move grow towers 50 along a grow line 202. In such an implementation, a series of belt conveyors arranged along a grow line 202, where each belt conveyor includes a different spacing distance among the paddles to achieve one-dimensional plant indexing.

In yet other implementations, a power-and-free conveyor may be employed to move grow towers 50 along a grow line 202 within environment 20, and along select grow lines 252 within environment 22. For example, a belt-driven power-and-free conveyor system may be employed to route and convey towers to a select grow line 202 within environment 20 and along a select grow line 252 within environment 22.

The tower conveyance mechanisms discussed herein can be operated in a continuous mode where grow towers 50 are incrementally advanced along a circuit such that a given tower 50 remains in chamber 20 for a desired period of time (e.g., 16 hours) and in chamber 22 for a desired period of time (e.g., 8 hours). Alternatively, grow towers 50 may also be advanced from one zone to another in a batch process, as opposed to a continuous, incremental mode. Either or both of chambers 20, 22 may include a buffer space in the grow line 202 or 252 to achieve various operational advantages, such as facilitating batch processing for tower conveyance. For example, if the desired diurnal photoperiod for a crop to be grown in system 10 is 16 hours, grow lines 252 in chamber 22 may be configured to include a number of spaces equal to the number of spaces across the entire grow line 202 (path sections 202a and 202b) within chamber 20. In such a configuration, a control system may cause the conveyance system to load the grow towers 50 located on path section 202b to be loaded within grow lines 252 in chamber 22 in a single batch process. In a next phase, the grow towers 50 located on path section 202a could be loaded on path section 202b. In a final phase of the process, grow towers 50 scheduled for loading into chamber 20 could be loaded from grow lines 252 onto path section 202a. This process could be repeated every 8 hours to achieve the desired 16-hour photoperiod. Of course, the system could be configured to achieve other desired photo periods. For example, providing extra capacity or buffer space in the night zone allows for additional flexibility in the case where system operators may desire to vary the photoperiods (such as from 3-5 hour night periods, where less night zone capacity is required, to 8 hour night periods, where more night zone capacity is required).

System 10 may also include transition zones or other mechanisms for pre-conditioning plants in grow towers 50 (or other grow containers) prior to being transitioned between chambers 20 and 22. For example, if the operating temperatures of chambers 20 and 22 are quite different, a rapid change may cause condensation to form on the plants and/or cause plant stress. In one implementation, prior to running a batch transition process, the irrigation system may supply nutrient solution that has been cooled to a relatively lower temperature to the grow towers in path section 202b. This cooling process may occur for 30 to 60 minutes prior to the batch process to cool the plants within the grow towers 50 to ease the transition from the relatively high temperature in chamber 20 to the lower temperature in chamber 22. In addition, the irrigation system may also be configured to provide solution to grow towers 50 on grow lines 252 at a relatively higher temperature to pre-condition the plants for the transition to the conditions in growth chamber 20. Conversely, the irrigation system could be implemented to operate in the opposite manner. For example, the irrigation system could be configured to supply relatively warm solution to plants that have just entered the colder, "night" chamber, and/or to supply relatively colder solution to plants that have just entered the relatively warmer "day" chamber.

Still further, whether run in a batch or continuous mode, the system 10 may also be augmented to include discrete buffer spaces configured to achieve more gradual transitions between chamber 20 and 22. For example, chamber 22 may be augmented to include an inject buffer space that holds plants in a separate environment with graduated temperature declines, gradually fading lighting (to simulate dusk) and irrigation solution prior to injection onto a grow line 252. Chamber 22 may also include an eject buffer space to provide for gradually increasing temperature, light and other conditions prior to insertion onto path section 202a of chamber 20.

Other implementations are possible. For example, while the systems illustrated in FIGS. 1 and 2 disclose a system that operates as a loop, the invention can be applied to a linear system where a grow line can extend through multiple zones along a path from a grow container injection point to an ejection point for harvesting. Still further, while the system described above has been described as effecting a night zone and a day zone, the system could be configured to include more than two zones. For example, a dawn/dusk zone may be transposed between the night and day zones. Still further, the zones need only vary by one environmental condition and need not be as drastically different as day/night zones.

Figure 5:
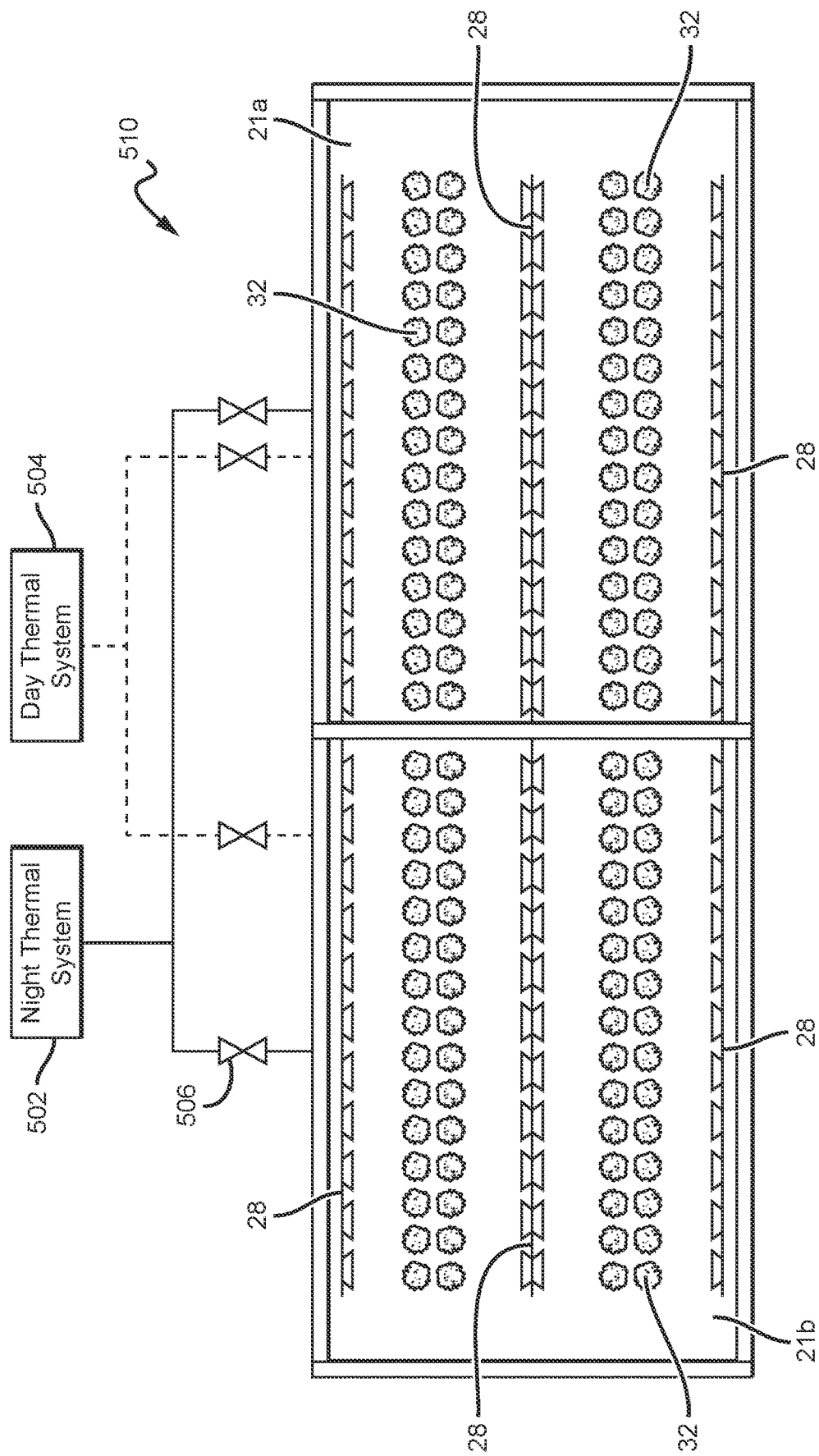
FIG. 5 is a functional block diagram illustrating another example implementation including separate growing zones operably attached to differentiated environmental control systems.
Figure 6:
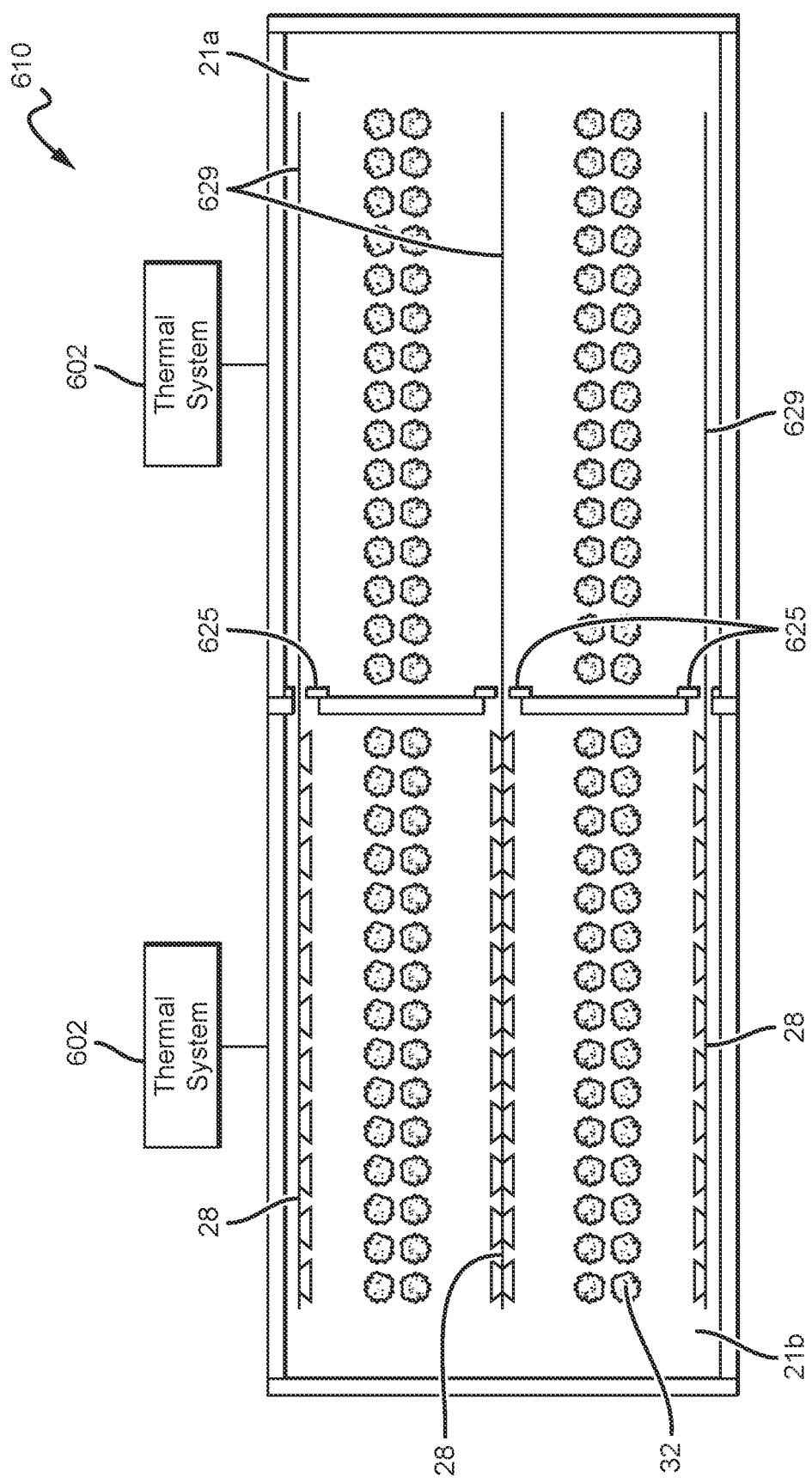
FIG. 6 is a functional block diagram illustrating another example implementation including separate growing zones and a lighting system that is movable among the growing zones.

Still further, FIGS. 5 and 6 illustrate additional embodiments where the crops or plants remain stationary in growth chambers, but equipment that controls or influences growing conditions are routed and/or conveyed to the growth chambers under a set of programmed controls. FIG. 5 illustrates another example implementation utilizing separate growing zones. In the implementation shown, the farm production system 510 includes two or more growth chambers (e.g., chambers 21a, 21b) that each define a separate thermal zone. Different thermal conditions (such as day and night thermal conditions) are controlled by separate thermal systems 502, 504 (e.g., one for day conditions and one for night conditions). Selector mechanisms 506 in the working fluid distribution system (e.g. controllable baffles in air ducts) control which thermal zone each unit 502, 504 serves at any given time. The number of thermal zones and size of each thermal unit may be a function of day/night durations. For example, a crop with 16-hr day/8-hr night regimen could use 3 thermal zones or growth chambers, with the day thermal unit 504 sized to supply two zones and the night unit 502 sized to supply one zone. In the embodiment illustrated in FIG. 5, the two-zone system could be used for crops having a desired regimen of a 12-hr day/12-hr night cycle. A separate control system would control the light emitting sources 28 according to a desired day-night timing cycle. In the implementation shown, a conveyance mechanism for the grow containers 32 is not needed to move crops or grow containers 32 between chambers 21a, 21b, but still may be used to convey crops into and out of the chambers.

In the implementation shown in FIG. 5, several options exist for configuring the thermal units and the selector mechanism 506. In one implementation, thermal units 502 and 504 are selectively connected to the chambers 21a, 21b by a series of air ducts. The selector mechanism 306 in this implementation can be a set of controlled air flow diverters (such as baffles or flaps that open and close) to route the respective outputs of the thermal units 502, 504 to the chambers 21a, 21b as desired. In another example implementation, each thermal unit 502, 504 could be dedicated to a particular chamber 21a or 21. In such an implementation, the selector mechanism (e.g., a series of controllable valves) could be configured to selectively route the output of separate liquid heat exchanger units (each associated with a set of target environmental conditions) to the thermal units 502, 504 as desired.

The implementations described above in connection with FIG. 5 can be configured to provide several advantages. For example, thermal systems may be configured and sized for a narrower range of conditions and do not need to handle transition between day/night conditions, resulting in CAPEX and OPEX savings for thermal system. The thermal systems may run continuously under substantially the same conditions, resulting in higher reliability versus daily cycling. Transitions between thermal conditions in each chamber 21a, 21b may be implemented relatively rapidly, dictated at least partially by the speed of the selector mechanism 506 as opposed to a thermal system ramp time.

FIG. 6 sets forth an alternative embodiment. In the implementation shown in FIG. 6, light emitting sources 28 are conveyed between separate growth chambers 21a, 21b. The farm system 610 may include one more interfaces 625 to allow conveyance mechanisms 629 to transfer the light emitting sources 28 between the chambers 21a, 21b. Light emitting sources 28 move between chambers 21a, 21b (e.g. on conveyance track) such that lights are only in a given chamber when that chamber is in a day condition and lights are absent at night.

Interfaces 625 may each be formed by a slot or other gap in the physical barrier wall that separates chambers 21a, 21b. The interfaces 625 may also include doors that open and close to permit the light emitting sources 28 (typically mounted in a rack or other matrix structure) to pass through. The conveyance mechanisms may include tracks and other structures to convey racks of light emitting structures 28 as desired between the zones on a timed schedule. Other implementations are also possible. For example, an air curtain system can be used to generate a barrier of air to substantially separate the environments of chambers 21a, 22 in addition to or in lieu of doors.

In the implementation shown, separate dedicated thermal systems 602 operate to control thermal conditions in each zone or chamber 21a, 21b. In another implementation, thermal conditions could be managed based on the configuration described in FIG. 5 above, where selector mechanisms route conditioned air from the units 502 and/or 504 to each chamber 21a, 21b based on the desired growing regimen.

The number of zones or chambers may be a function of day/night durations desired for a given crop. For example, a crop with 16-hr day/8-hr night growing cycle could use a farm system 610 with three zones, where two zones have light emitting sources 28 disposed therein at any given time. In the embodiment illustrated in FIG. 6, the two-zone system could be used for crops having a desired regimen of a 12-hr day/12-hr night grow cycle.

The implementation set forth in FIG. 6 provides advantages by reducing lighting system cost. Lights are only required in a given zone during day condition. Furthermore, the light emitting sources may be utilized 24 hours per day, as opposed to stationary lights that are turned off at night. Such a configuration achieves capital expenditure and utilization efficiencies related to lighting system costs of the farm system.

Controllers described above may be implemented by a combination of hardware and software. FIG. 4 illustrates an example of a computer system 800 that may be used to execute program code stored in a non-transitory computer readable medium (e.g., memory) in accordance with embodiments of the disclosure. The computer system includes an input/output subsystem 802, which may be used to interface with human users or other computer systems depending upon the application. The I/O subsystem 802 may include, e.g., a keyboard, mouse, graphical user interface, touchscreen, or other interfaces for input, and, e.g., a LED or other flat screen display, or other interfaces for output, including application program interfaces (APIs). Other elements of embodiments of the disclosure, such as the controller 620, may be implemented with a computer system like that of computer system 800.

Program code may be stored in non-transitory media such as persistent storage in secondary memory 810 or main memory 808 or both. Main memory 808 may include volatile memory such as random access memory (RAM) or non-volatile memory such as read only memory (ROM), as well as different levels of cache memory for faster access to instructions and data. Secondary memory may include persistent storage such as solid state drives, hard disk drives or optical disks. One or more processors 804 reads program code from one or more non-transitory media and executes the code to enable the computer system to accomplish the methods performed by the embodiments herein. Those skilled in the art will understand that the processor(s) may ingest source code, and interpret or compile the source code into machine code that is understandable at the hardware gate level of the processor(s) 804. The processor(s) 804 may include graphics processing units (GPUs) for handling computationally intensive tasks.

The processor(s) 804 may communicate with external networks via one or more communications interfaces 807, such as a network interface card, WiFi transceiver, etc. A bus 805 communicatively couples the I/O subsystem 802, the processor(s) 804, peripheral devices 806, communications interfaces 807, memory 808, and persistent storage 810. Embodiments of the disclosure are not limited to this representative architecture. Alternative embodiments may employ different arrangements and types of components, e.g., separate buses for input-output components and memory subsystems.

Those skilled in the art will understand that some or all of the elements of embodiments of the disclosure, and their accompanying operations, may be implemented wholly or partially by one or more computer systems including one or more processors and one or more memory systems like those of computer system 800. In particular, the elements of automated systems or devices described herein may be computer-implemented. Some elements and functionality may be implemented locally and others may be implemented in a distributed fashion over a network through different servers, e.g., in client-server fashion, for example.

Additional operational and configuration details of an example farm system environment in which implementations can be used are set forth in International Application Serial Nos. PCT/US19/023201 and PCT/US19/058770, which are incorporated by reference herein for all purposes. In addition, while certain implementations are described as operating in connection with vertical grow towers, other implementations can be configured to detect anomalies in farm systems employ other grow structures, such as horizontal trays stacked in vertical configurations, and the like.

Although the disclosure may not expressly disclose that some embodiments or features described herein may be combined with other embodiments or features described herein, this disclosure should be read to describe any such combinations that would be practicable by one of ordinary skill in the art. Unless otherwise indicated herein, the term "include" shall mean "include, without limitation," and the term "or" shall mean non-exclusive "or" in the manner of "and/or."

Those skilled in the art will recognize that, in some embodiments, some of the operations described herein may be performed by human implementation, or through a combination of automated and manual means. When an operation is not fully automated, appropriate components of embodiments of the disclosure may, for example, receive the results of human performance of the operations rather than generate results through its own operational capabilities.

All references, articles, publications, patents, patent publications, and patent applications cited herein are incorporated by reference in their entireties for all purposes to the extent they are not inconsistent with embodiments of the disclosure expressly described herein. However, mention of any reference, article, publication, patent, patent publication, and patent application cited herein is not, and should not be taken as an acknowledgment or any form of suggestion that they constitute valid prior art or form part of the common general knowledge in any country in the world, or that they are disclose essential matter.

What is claimed is:

1. A controlled environment agriculture system, comprising:
    a first growth space associated with a first set of target environmental settings;
    a second growth space associated with a second set of target environmental settings;
    two interfaces between the first growth space and the second growth space;
    a plurality of grow towers for containing plants for growing during a growth phase;
    a conveyance mechanism operative to transfer the grow towers between the first and second grow spaces via the one or more interfaces, the conveyance mechanism comprising a grow line having
    a first grow line section extending from the first growth space to the second growth space via a first interface of the one or more interfaces,
    a second grow line section extending from the second growth space to the first growth space via a second interface of the one or more interfaces,
    wherein the plurality of grow towers extend vertically from the grow line, and
    wherein the conveyance mechanism is configured to convey the plurality of grow towers from the first growth space to the second growth space along the first grow line section via the first interface and to convey the plurality of grow towers from the second growth space to the first growth space along the second grow line section via the second interface; and a buffer space disposed between the first and second growth spaces, wherein the buffer space includes a third set of target environmental settings.

2. The controlled environment agriculture system of claim 1 wherein the first growth space contains light emitting sources and the second growth space does not include light emitting sources.

3. The controlled environment agriculture system of claim 1 further comprising a controller operatively connected to the conveyance mechanism and further operative to control the conveyance mechanism to transfer the grow towers between the first and second grow spaces according to a time schedule.

4. The controlled environment agriculture system of claim 1 further comprising a controller operatively connected to the conveyance mechanism and further operative to control the conveyance mechanism to cycle the grow towers between the first and second grow spaces according to a time schedule.

5. The controlled environment agriculture system of claim 1 wherein the grow line is a continuous loop.

6. The controlled environment agriculture system of claim 1 further comprising an irrigation system configured to supply aqueous nutrient solution to one or more grow towers in the first growth space according to a first mode to one or more grow towers in the second growth space in a second mode.

7. The controlled environment agriculture system of claim 6 wherein the first mode is a continuous irrigation mode, and the second mode is a pulsed irrigation mode.

8. The controlled environment agriculture system of claim 1 wherein each of the one or more interfaces comprises a door movable from a closed position to an open position.

9. The controlled environment agriculture system of claim 1 wherein each of the one or more interfaces comprises an air curtain mechanism.

10. The controlled environment agriculture system of claim 2 wherein the first growth space is larger than the second growth space.

11. The controlled environment agriculture system of claim 10 wherein the grow towers are attached to the grow line at a first spacing in the first growth space and a second spacing in the second growth space; wherein the first spacing is different from the second spacing.

12. The controlled environment agriculture system of claim 1 comprising a first thermal system dedicated to the first growth space and a second thermal system dedicated to the second growth space.

13. The controlled environment agriculture system of claim 1 further comprising a third growth space adjacent to the second growth space; and wherein the conveyance mechanism is configured to convey the grow towers from the first growth space to the second growth space and from the second growth space to the third growth space in a linear manner.

14. The controlled environment agriculture system of claim 10 wherein the first growth space is configured to contain a first number of grow towers and the second growth space is configured to contain a second number of grow towers, and wherein the first number is equal to the second number.

15. The controlled environment agriculture system of claim 1 wherein the first growth space is a day zone wherein the first set of target environmental settings comprises a first temperature set point of at least 23 degrees Celsius and a first lighting parameter; and wherein the second growth space is a night zone wherein the second set of target environmental settings comprises a second temperature set point lower than 23 degrees Celsius and a second lighting parameter lower than the first lighting parameter.

16. The controlled environment agriculture system of claim 15 wherein the second lighting parameter corresponds to no light.

17. The controlled environment agriculture system of claim 1 wherein at least one of the one or more interfaces comprises a brushing mechanism to disturb plants in the plurality of grow towers as they pass by.

18. The controlled environment agriculture system of claim 1 wherein the grow line has a u-shaped travel path within the first growth space.

19. The controlled environment agriculture system of claim 18 wherein the conveyance mechanism comprises a return transfer actuator in the second growth space configured to extract grow towers from the first grow line section and place grow towers on the second grow line section.

* * * * *